United States Patent [19]

Seppälä et al.

[11] Patent Number: 6,011,092
[45] Date of Patent: Jan. 4, 2000

[54] THERMOPLASTICIZED STARCH COMPONENT AND PROCESS FOR THE PREPARATION THEREOF

[75] Inventors: Jukka Seppälä; Minna Malin, both of Helsinki; Soili Peltonen, Rajamäki; Elina Heikkilä, Vantaa; Jani Vuorenpää, Helsinki, all of Finland

[73] Assignee: Valtion teknillinen tutkimuskeskus, Vuorimiehentie, Finland

[21] Appl. No.: 08/981,933

[22] PCT Filed: Jul. 10, 1996

[86] PCT No.: PCT/FI96/00402

§ 371 Date: Jan. 12, 1998

§ 102(e) Date: Jan. 12, 1998

[87] PCT Pub. No.: WO97/03120

PCT Pub. Date: Jan. 30, 1997

[30] Foreign Application Priority Data

Jul. 12, 1995 [FI] Finland ..................................... 953408
Aug. 1, 1995 [FI] Finland ..................................... 953655

[51] Int. Cl.$^7$ ................. C08L 3/04; C08L 3/06; C08L 3/08; C08L 3/17
[52] U.S. Cl. ............... 524/47; 523/128; 524/50; 524/51; 525/54.25; 527/300; 527/301; 527/311
[58] Field of Search ..................... 527/300, 301, 527/311; 525/54.24; 523/128; 524/47, 50, 51

[56] References Cited

U.S. PATENT DOCUMENTS

| | | | |
|---|---|---|---|
| 5,412,005 | 5/1995 | Bastioli et al. | 524/47 |
| 5,756,576 | 5/1998 | Bruls et al. | 525/66 |
| 5,780,568 | 7/1998 | Vuorenpaa et al. | 525/54.24 |
| 5,847,027 | 12/1998 | Marten et al. | 523/404 |

FOREIGN PATENT DOCUMENTS

| | | |
|---|---|---|
| 0519367A1 | 12/1992 | European Pat. Off. . |
| 0530987A1 | 3/1993 | European Pat. Off. . |
| 0535994A1 | 4/1993 | European Pat. Off. . |
| WO9219680 | 11/1992 | WIPO . |
| WO9407953 | 4/1994 | WIPO . |
| WO9504108 | 2/1995 | WIPO . |

*Primary Examiner*—Peter A. Szekely
*Attorney, Agent, or Firm*—Birch, Stewart, Kolasch & Birch, LLP

[57] ABSTRACT

The invention relates to a process for thermoplasticizing starch, a melt-processible polymer composition, which contains a starch-based component and a thermoplastisized polymer component, and a method for preparating such a composition. According to the invention the starch component, which contains hydroxyl groups capable of reacting with isocyanate groups, is modified so that it can be dissolved or gelatinized/plasticized in the melt of a hydroxy acid polymer. The starch component is then reacted with a thermoplastic component formed by a hydroxy acid polymer, in particular a lactic acid polymer, in order to produce a melt-processible, biologically degradable starch-based polymer, which can be used as an adhesive and for coating of paper and cardboard products and for preparation of injection moulded and thermoformed articles.

45 Claims, 5 Drawing Sheets bar 20μm

THERMOPLASTICIZED STARCH COMPONENT AND PROCESS FOR THE PREPARATION THEREOF

This application is the national phase under 35 U.S.C. §371 of prior PCT International Application No. PCT/FI96/00402 which has an International filing date of Jul. 10, 1996 which designated the United States of America, the entire contents of which are hereby incorporated by reference.

The present invention relates to a process according to the preamble of claim 1 for plasticizing starch.

The invention also relates to a melt-processible polymer composition according to the preamble of claim 6. A composition of this kind generally comprises a starch-based component and a thermoplastic polymer component.

Furthermore, the invention concerns a method according to the preamble of claim 25 for preparing a melt-processible polymer composition.

Environmental concerns and green concepts are creating new markets for products based on renewable resources. These trends are seen e.g. in the industrial sectors of packaging, hygiene and glue, for which recyclability, reusability, compostability, biodegradability and nonstressability of the environment are contemporary requirements. There is also an increasing trend to substitute petrochemically derived products with refined biopolymers.

Thermoplastization of natural polymers, in particular starch, is discussed in a large number of patents and patent applications (e.g. GB 2 190 093 A, U.S. Pat. No. 4,673,438, EP 282 451 A3, EP 0 298 920 A3, EP 0 304 401 A2, EP 0 326 517 A1), which disclose opening of the granular structure of starch by melt processing generally in the presence of water and some plastisizer such as glycerol, ethylene glycol and oligomers thereof, and other adjuvants. Even if the products thus obtained are thermoplastic and biodegradable, their water resistance is poor which considerably limits their use. These kinds of thermoplastic starch products tend to absorb water when the humidity of air is high, which changes their mechanical properties. On the other hand, at low moisture contents, the water contained in the product evaporates and the products become more brittle. Attempts have been made to improve the properties (water resistance and mechanical properties) of thermoplastic starches by blending them with synthetic polymers, as disclosed, e.g., in the following applications: EP 0 404 723 A2, EP 0 409 788 A3, EP 0 404 727 A3, EP 0 404 728 A3, EP 0 408 501 A3, EP 0 408 502 A3, EP 0 409 782 A3 and EP 0 409 781 A3, FI 902662, WO 92/19680, FI 921264 and EP 0 519 367 A1. Often the used synthetic polymers are hydrophilic and even if they do improve the mechanical properties the water resistance of the products still remains poor. The above-mentioned patent applications describe improvement of the water resistance of thermoplastic starches by blending them with traditional thermoplastic polymers, polyolefins and polyesters, prepared from the raw materials of petrochemistry. The thus obtained blends and mixtures are hetero phasic and their biodegradability is impaired when the amount of non-degradable components increases.

Starch has been mixed also with biodegradable synthetic polymers in addition to synthetic, nondegradable polymers (e.g. poly(caprolactone), polylactide), as has been described in the following patent applications and articles: WO 92/19680, EP 0 530 987 A1, EP 0 535 994 A1, Koenig, M. F. and Huang, S. J., Biodegradable Polymers/Starch Blends, Composites and Coatings, Polymer Materials Science Engineering 67(1992) s. 290–291. Starch has increased the biodegradability of the mixture, but essentially diminished the mechanical properties of the blends. The blended material has also often been non-homogeneous, consisting of dispersed or lamellar structures.

Various coupling reactions have been used to improve the blending of the starch component and the synthetic polymer. The patent application DE 41 16 404 A1 concerns a mixture of a thermoplastic starch with polyolefins and an ethylene-acrylatemaleic anhydride copolymer. In the mixture, the copolymer is coupled by ester bonds to the thermoplastic starch and contributes to the compatibilization of the blend. The content of non-biodegradable polyethylene in the blend was 10–35% and the content of copolymer was 10–40%.

According to the patent application WO 93/23456, reactive blending of natural polymers and synthetic polymers has resulted in compositions in which two polymers have been coupled to each other with covalent and physical bonds at the interfaces of the polymers. Starch, cellulose, proteins, amino acids and lipids have been used as natural polymers, and polymers containing anhydride groups, such as styrene-maleic anhydride copolymers or maleated ethylene propylene copolymers, have been used as synthetic polymers. In the composition, one polymer constitutes the continuous phase, while the other is dispersed into it. The particle size of the dispersed phase is 0.011–100 microns.

In the majority of the investigations described above the starch component is a natural starch or a starch component of such a kind, that it can be plasticized in the presence of water and other hydrophilic plasticizers, or be used in granular form.

In the method according to the application WO 92/16583 a biodegradable composition is described, which is produced by melt processing of a starch derivative, an ester or ether, a small amount of plasticizer (water) and alkenol homo- or copolymer (poly(vinyl alcohol)). The fraction of the alkenol polymer in the mixture is 10–200 parts to 100 parts of starch. The material has been used to produce candle covers by injection moulding and foamed products for packaging applications. The most suitable degree of substitution of the starch derivatives is >0.8, for acetates preferably 0.8–1.5.

Thermoplastic starch products have been produced also by plasticizing starch acetate with suitable plasticizers. The patent application WO 92/19675 describes a starch acyl derivative, especially acetate, produced from an amylose rich starch, and gelling thereof with biodegradable plasticizers, such as citric acid ethylene esters, glycerol acetates and lactic acid esters. The product has been described as humidity proof, thermoplastic, environmental friendly, translucent and processible to casting films. Good results can be achieved only with products rich in amylose, however, which constrains the choice of starch suitable as raw material.

From the patent application WO 93/20110 a degradable polymer composition is known, which can be processed with heat and pressure into products of high dimensional stability. The composition consists of a starch, which has been esterified from starch rich in amylose (minimum 50%), and which owns a degree of substitution of at least 1.5 and which is plasticized with softeners (citrates, glyceric esters, phthalates, phosphates, succinates etc.) having molar masses of less than 2,000 g/mol, preferably in the range of 100 to 1,000 g/mol.

As a summary of the state of the technique, it can be concluded that no known solution has resulted in biodegradable and melt processible starch based polymer compositions that would consist only or at least substantially of materials derived from renewable raw material of low cost.

It is an object of the present invention to eliminate the problems relating to the prior art and to provide an entirely novel process for plasticizing starch. It is another object of the invention to provide a new melt processable, starch based polymer composition and a process for the preparation thereof.

The invention is based on the idea that the starch component is compatibilized with the thermoplastic component so as to provide an essentially homogeneous blend. The thermoplastic component used comprises a biodegradable hydroxy acid polyester, which is essentially hydroxy-terminated. This means that the terminal groups essentially (or at least mainly) consist of hydroxyl groups. According to the invention a polyester prepolymer is reacted with a diisocyanate, which reaction results in an isocyanate-terminated oligomer, which is capable of reacting with the hydroxyl groups of the starch.

The invention thus utilizes chemical compatibility of isocyanate and hydroxyl groups, which makes it possible to compatibilize the starch component with a polyester-based component. According to the invention, good mechanical properties are achieved by using only known biodegradable materials, such as starch and, e.g., a polyester consisting of lactic acid units, as polymeric components.

The published patent application WO 93/23456 describes chemical reactions that may take place between natural polymers and synthetic polymers which contain functional groups during reactive blending. A more precise description is, however, given only of the formation of ester or amide and imide bonds between the natural polymer and the synthetic polymer. Furthermore, a non-biodegradable synthetic polymer is used in all examples. It appears from the publication that the prior art products are heterogeneous and consist of a continuous phase and a dispersed phase.

In connection to the present invention it has been noticed, that even a very small amount of hydroxyl acid based oligomers suffice alone to thermoplasticize the starch component and to give rise to a homogeneous structure. The possibility of urethane bonds forming between the above mentioned components improves further the compatibility of the components. This is why the present invention makes it possible to achieve as good or even better strength properties than with the solution known from e.g. PCT-application WO092/19680, even if components known to be biodegradable or compostable are used.

More specifically, the process according to the invention for plasticizing starch is characterized by what is stated in the characterizing part of claim 1.

The process according to the invention for preparing a melt-processable polymer composition is characterized by what is stated in the characterizing part of claim 6.

The production method of the composition is characterized by what is stated in the characterizing part of claim 25.

The preferred applications of the invention are described in claims 35–39.

As described above, the solution according to the invention is based on the idea that the thermoplastic component is made to react with the starch component, which allows for thermoplasticization of starch. Without restricting the invention to any specific model, it can be said that the reaction between the thermoplastic component and the starch component, or their combined effect, possibly at least partly, or even to high extent, results in the thermoplastic component being grafted to the starch.

A hydroxy acid polyester, which is essentially hydroxy terminated (i.e. the terminal groups consist essentially of hydroxyl groups), is used for the thermoplastic component. In practice, some carboxyl groups are still present in the hydroxy acid polyester as a result of the small amount (<10 p-%, preferably <5 p-%) of free hydroxy acid, commonly lactic acid. Thermoplastic polyester is in this application also designed as "prepolymer" or "hydroxy acid oligomer" because its molar mass is relatively small in comparison to the molar mass of the resulting product. The rubbery stiffness of the prepolymer can be increased by adding ε-caprolactonic comonomers.

"Homogeneous structure" means in this invention that the obtained polymer composition has an even fine structure with respect to the practical applications. This follows from the fact that the components of the composition are "soluble" in each other. In the present context the concept of "solubility" should be broadly interpreted to mean both that the starch component completely enters the same phase as the polyester melt, and that dissolution possibly only takes place in the granular structure of the starch component in the interface between said component and the polyester, the components of the composition forming together a compatibilized, thermoplastic melt, in which the components can be brought to react or interact with each other. Starch esters and starch ethers are examples of soluble starch components, whereas starch and gelatinized starch form compatibilized, thermoplastic melts with the prepolymer.

"Modified starch", "modified form" of the starch and "starch component" are used as synonyms for the starch-based component which according to the above presented definition is "soluble" in the polyester melt.

Films, which do not essentially contain any agglomerates, can be formed from the macroscopically homogeneous composition. Typically the homogenous polymer structure is at least partly translucent. The term "compatibilization" is used to designate the enhancing of the compatibility of two dissimilar polymers, e.g. by bringing them into a form in which they are capable of reacting with each other without separating from each other within a moderate length of time. The aim is to provide a macroscopically homogeneous blend, in which the components are mutually at least partly soluble and/or physically compatible. "Compatibilization" thus encompasses both grafting of the starch component and chemical reactions of the starch and the polyester that enhance the compatibility of the components. The term also covers methods for improving the physical compatibility of the starch and the polyester.

In this invention the term "bringing to react" is used to designate that the modified starch, i.e. the starch component, is brought into contact with the thermoplastic component. The term refers to the fact that the starch component contains hydroxy groups and the prepolymer contains isocyanate groups, which are known to react with such groups. The term should not be understood so, however, that the reaction of the reactive groups only or even always would yield a reaction product of the starch component and the thermoplastic.

According to the invention, the compatibilization, which comprises the internal plasticization of the starch, results in thermoplastic compositions, which contain no free small-molecular components, which easily would leave the material. Thus, essentially migration-free products can be manufactured with the solution according to the invention.

The present method consists roughly of the following steps:

forming an hydroxy terminated polyester, with a molar mass of 500 to 15,000 g/mol, from hydroxy acid monomers and diol, and polymerizing the polyester in an optional order with diisocyanate and a starch component which is "soluble" (including gelatinizible/plasticizible) in a hydroxy acid polymer melt.

At the outset of the method the number average molar mass of the hydroxyl group terminated prepolymer is, based on primary calibration of GPC (in comparison only to polystyrene standards) between 500 and 15,000 g/mol. Typically, however, prepolymers are used having a number average molar mass measured with a corresponding method is between 500 and 6,000 g/mol ("the real" molar masses may be almost half of those values).

The terminal groups of the prepolymer is formed into hydroxyl groups by reacting the polymer with, e.g., an aliphatic diol. In practice, during preparation of the prepolymer water is first removed from hydroxyl acid monomer, if necessary, and then it is copolymerized with the diol. After this reaction the polyester and the starch are reacted with the diisocyanate in optional order. The chain length of the oligomer which is contacted with the starch component can be regulated, e.g., by varying the point of time for adding the starch component.

In order to combine (e.g. by grafting) starch with the desired thermoplastic polyester and in order to successfully carry out mass polymerization, the starch has to be or it should be brought into such a form that it is, according to the above presented definition, "soluble" in the melt formed by the hydroxy acid polymer.

One preferred embodiment comprises forming a starch derivative, e.g. an ether or an ester which dissolves into said melt. The degree of substitution of the derivative is regulated so that there are left at least some free hydroxyl groups which are capable of reacting with the isocyanate groups. Typically, for an esterified or e.g. methyl etherified derivative this means that the degree of substitution is less than 3. For other derivatives, such as hydroxy propyl starch even higher degrees of molar substitution are, however, possible.

The starch can also be made soluble or compatibilizable with a hydroxy acid polymer melt by gelatinizing it first. Methods for gelatinization of starch are disclosed in, e.g., Zobel, H. F., Gelatinization of Starch and Mechanical Properties of Starch Pastes, in Starch, Chemistry and Technology (ed. Whistler, Be Miller, Paschall), pp. 285–309, 2nd Edition (1984), Academic Press, Inc. U.S.A.

Starch can further be dissolved, i.e. compatibilized with the melt of a hydroxy acid polymer by thermoplastization by bringing enough energy to the reaction. Thus, this kind of thermoplastic starch is usually defined as a product which is formed by the transformation (destructurization) of the native and semicrystalline structures in molecular-disperse homogeneous mixtures consisting of poly-α-anhydroglucose and additives. Such destructurization process can be accomplished by applying energy to the starch. The physical or chemical factors involved are temperature, shear stresses, shear rate, residence time, water content and the resulting quantity of energy applied. The straining of starch in a batch mixer (Brabender PL 2000) equipped with roller blades and connected to a variable speed motor leads to both a thermal and a mechanical energy input to the starch or the plasticised mass.

The total specific energy input can be calculated according to equation (1):

$$E = (W + q + \cdot m_s \lambda) / \cdot m \quad (1)$$

where
W=dissipation of mechanical energy by torque of the screw, q=heat transfer through the barrel wall,

•$m_s\lambda$=latent heat from condensing steam.

Under normal circumstances, specific mechanical energy (SME=W/•$m_s\lambda$) is the largest contributor to total specific energy. It has been reported /1/ that extruded corn semolina, wheat semolina, wheat flour, corn grits and potato starch need specific mechanical energy (SME) input that is higher than 500–600 kJ/kg before important granule damage occurs. In the present invention the specific mechanical energies typically vary between 500 kJ/kg and 5000 kJ/kg, usually being about 1000 kJ/kg.

In principle a variety of methods can be thought of to evaluate the structural modification. DSC is a very sensitive method that enables the measurement of thermo-dynamic characteristics of starch. Highly transformed starch exhibits no gelatinization endothermic peak, whereas partially damaged granules give reduced endothermic peaks. The standard definition of gelatinization describes the loss of the semicrystallinity of the starch granules in the presence of heat and high quantities of water whereby no or very little molecular cleavage/degradation or depolymerization occurs. DSC can be used as an indirect method of measuring the degree of destructurization, since during DSC-measurements the structures of as yet unconverted structures (during previous processing steps) are then disintegrated.

The degree of destructurization has been defined as follows:

$$DG\ (\%) = (1 - H_{DSC}/H_{DSC0}) * 100 \quad (2)$$

where $H_{DSC}$=heat of destructured sample $H_{DSC0}$=heat of the native starch (10.2 J/g for NatuReal™ Barley Starch).

In the present invention plasticized mass is treated under thermal and mechanical energy input. As a consequence, a melting and disordering of the molecular structure of the starch granules takes place, so that a substantially destructurized starch is obtained. FIG. 1 indicates the enthalpy of destructured sample relating to example 28. The decreasing number of intact native starch granules (visible by polarisation crosses, so-called Maltese Crosses) can also be confirmed under a polarization microscope (FIG. 2).

Reference:/1/. Mercier, C. and Feillet, P., *Modification of carbohydrate components by extrusion-cooking of cereal products*, Cereal Chem. 52 (1975), pp. 283–297. Ref. in Extrusion Cooking of Starch and Starchy Products. Extrusion Cooking. Edited by Mercier, C. et al., American Association of Cereal Chemists, St. Paul-U.S.A. (1989).

An amount of at least 1%, preferably about 2 to 90%, of a polyester is added to a starch component according to the invention. An addition of 5 to 60% polyester is preferred for melt-processing of the product.

Due of their great reactivity practically all isocyanate groups react with the hydroxyl groups present in the reaction mixture. As a result, the polyester is probably attached to the starch component by urethane bonds. If the starting compounds contain carboxylic groups, these groups will form amide bonds. The carboxylic groups will not essentially disturb the progress of the desired urethane forming reaction, because they are not as reactive as the hydroxyl groups.

According to a preferred embodiment of the invention, the above described polymerization/coupling reaction is carried out by mixing modified starch with an isocyanate terminated polyester which has been brought into liquid state, e.g., by heating it. After dissolution the mixture is mixed and the temperature is raised above 60° C., preferably to at least about 150° C., in particular to about 160 to 220° C., and the mixing is continued until a maximum torsional momentum is obtained, i.e. until the viscosity of the mixture has clearly grown. The viscosity usually increases by a magnitude of several orders, whereas the momentum values grow by tens of percents. The mixing is therefore continued until the Brabender momentum designating the viscosity of the mixture has grown three times larger than the value of the initial melt containing the raw materials.

The obtained product is colourless, light yellow to light brown, the colour depending of the starch component used. The strength properties of the product depend on the molar masses of the starch and the polyester. Generally the product is as hard as plastics and it can be processed, e.g., by form pressing, injection moulding and thermoforming. A polymer composition shaped into a sheeting is translucent and only small agglomerates, if any, are visually discernable. The tests show that even rather small amounts of polyester have a distinctly thermoplastifying effect on modified starch, such as on starch acetate qualities having a high degree of substitution. By combining the polyester with starch and starch derivatives it is possible to make these substances more hydrophobic which is advantageous when the product is to be used for example in coating films for paper and cardboard.

Considerable advantages are obtained by the present invention. Thus, the polymer composition according to the invention, which contains a starch-based component and a chemically reacted thermoplastic polyester component, is thermoplastic and homogeneous; it has good mechanical properties and good water resistance. The polymer composition is mainly formed by raw materials which are derived from renewable natural resources and which are biodegradable/compostable. Furthermore, compatibilisation of the starch component with the hydroxy acid polymer will increase hydrophobic character considerably. The polymer compositions according to the invention are "internally plastisized", i.e. the coupling agent between the polyester and the starch seems to achieve chemical bonding of the components. Even if the starch component and the polyester would not have reacted chemically with each other, the end product is migration-free, because the molar mass of the polyester is large. Thus, in the present case no monomeric plasticizer is used which would easily migrate.

In the following, the invention will be examined more closely with the aid of a detailed description and with reference to a number of working examples. The following description and the examples refer to the attached drawings, of which FIG. 1A depicts the enthalpy of native corn starch and FIG. 1B indicates the enthalpy of destructured sample relating to example 28.

Figure 5:
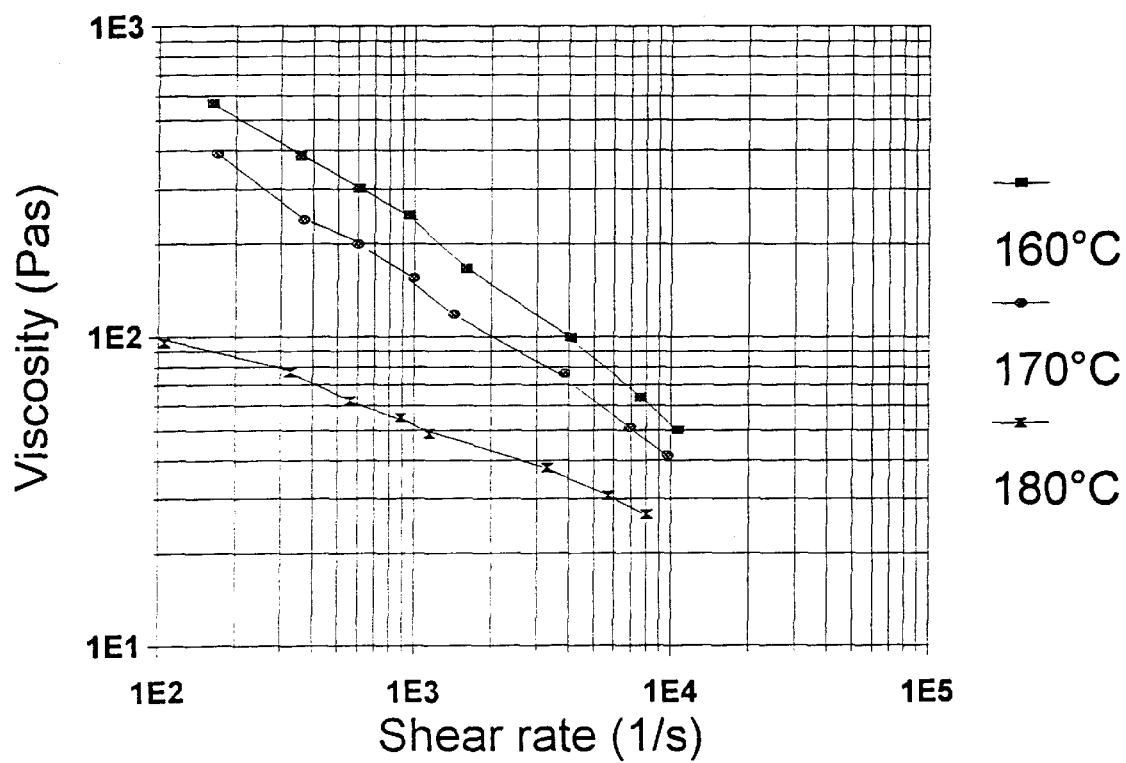

FIG. 5 indicates the results of capillary rheometry of sample relating to example 28.

Prepolymer Preparation

Depending on the amount of reactants, the polyester consists of 80–99.9% of hydroxy acid monomers, and 20–0.1% of a diol monomer. The hydroxy acid monomers can be aliphatic and possibly aromatic. The hydroxy acid monomers typically consist of $\alpha$-hydroxy acids, $\beta$-hydroxy acids or lactones. The aliphatic hydroxy acid monomers are preferably L-lactic acid monomers, D-lactic acid monomers or mixtures thereof (e.g. racemic D,L-lactic acid). Other examples of aliphatic hydroxy acid monomers are glycolic acid and $\alpha$-hydroxy-isobutane acid and mutual mixtures of these compounds as well as mixtures with the lactic acids. Aromatic hydroxy acids particularly worth mentioning are L-mandelic acid, D-mandelic acid or mixtures thereof (e.g. racemic D,L-mandelic acid) and p-hydroxybenzoic acid. Rubber like stiffness can be achieved by copolymerization of aliphatic hydroxy acid monomer(s) with 1–60 w-% of cyclic aliphatic lactone e.g. $\epsilon$-caprolactone monomer.

The preparation of the hydroxy terminated polyester prepolymer takes place for instance as described in an article by Härkönen, M., Hiltunen, K., Malin, M. and Seppälä, J., Properties and polymerization of Biodegradable Thermoplastic Poly(ester-urethane), J. M. S.-Pure Appl.Chem. A32 (4), pp. 857–862 (1995).

The preparation of the polyester by condensation polymerization of suitable hydroxy acid monomers can be carried out in any apparatus suitable for esterification reactions. According to a preferred embodiment the polyesterification is carried out as mass polymerization in the melt state, whereby the water formed as a condensation product can be removed by conducting dry inert gas into the polymer melt under stirring.

On a laboratory scale "Rotavapor"-type apparatus, which allows for continuous removal of water, can be used for preparing the polyester.

It is preferred to carry out the polyesterification in the presence of a catalyst and, according to one preferred embodiment, a known polyesterification catalyst is used. Catalysts of this kind are, for example, tin or alkyl or alkoxy compounds of tin, such as stannous octoate.

The molar mass of the polyesterification product grows at a rate dependent on the polymerization temperature. When the polymerization temperature increases above 210° C., decomposition of the polymer chains will begin to restrict the polymerization rate. The formation of a detrimental by-product, i.e. the lactide, will substantially increase at temperatures above 220° C. For the above reasons, it is preferred to increase the temperature of the polyesterification gradually in the temperature range of 140–200° C. at a rate of 5–50° C./h and in the temperature range of 200–230° C. at a rate of 0–30° C./h.

According to a preferred alternative, the polyesterification will be initiated at a temperature of about 160° C., and the temperature is then gradually increased to 210° C. Similarly, the pressure is gradually decreased from 220 to 40 mbar, and the condensation product is continuously removed with the aid of nitrogen. This standard procedure will produce a polyester-prepolymer, with a number average molar mass of about 2,000–8,000 g/mol (e.g. about 6,000 g/mol) and a polydispersitivity of about 1.7.

At the final stage of the polyesterification, the low molar mass fraction can, if desired, be removed from the reaction mixture by decreasing the pressure to cause said fraction to distill off.

Functionalization of the Chain Ends of the Prepolymer

The isocyanate used as a coupling agent of the starch component and the thermoplastic polymer best reacts with hydroxyl groups. Normally, during polymerization of hydroxy acids, one terminal group of the chain is carboxylic acid and the other is hydroxyl. The coupling of a prepolymer of this kind with diisocyanates has been found to be difficult and excessive cross-linking is a problem. According to the present invention this problem has been solved by preparing a prepolymer which contains hydroxyl groups at both ends of the polymer chain.

According to the invention the hydroxyl terminated prepolymer is obtained by adding to the hydroxy acid a suitable aliphatic diol as a raw material. The diol used can comprise, e.g. ethylene glycol or 1,4-butane diol, but also other diols are possible. Preferably the amount of the aliphatic diol is 0.1 to 10 mol-%, calculated from the amount of the hydroxyl acid monomers and the molar ratio between the hydroxyl and carboxyl groups of the monomers which are to be copolymerized is over 1. 1,4-butane diol is, for example, used in amounts of about 1 to 5 mol-%. The acid number of the OH-terminated polyester is preferably less than 20 mg KO/g. In particular, the acid number of the prepolymer is below 5 mg KO/g. p The molar mass of the functionalised polyester is lower than that of the unfunctionalized polyester.

The Starch Component and the Preparation Thereof

The starch component of the composition according to the invention can be based on any natural starch having an amylose concentration of 0 to 100% and an amylopectine concentration of 100 to 0%. Thus, the starch component can be derived from barley, potato, wheat, oat, peas, maize, tapioca, sago, rice and similar root or cereal plants. It can comprise a starch prepared from a natural starch by gelatinization or a starch derivative prepared by oxidation, hydrolysation, cross-linking, cationization, etherification and esterification. Preferably the starch component is an esterified or etherified starch having at least some free hydroxyl groups. As an example, starch ester (e.g. starch acetate) having a degree of substitution of less than 3, can be mentioned.

It has been found preferable to use a starch-based component which is derived from an ester formed by starch and one or several aliphatic $C_{2-24}$-carboxylic acids. The carboxylic acid component of an ester of this kind can then be derived from a lower alkane acid, such as acetic acid, propionic acid or butyric acid or a mixture thereof. The carboxylic acid component can, however, also be derived from natural saturated or unsaturated fatty acids. Palmitinic acid, stearic acid and mixtures thereof are examples of the fatty acids. The ester can also comprise both long and short chained carboxylic acid components. The mixed esters of acetate and stearate are examples of the latter esters.

The preparation of fatty acid esters of starch can be carried out for example as disclosed in the prior art publication by Wolff, I. A., Olds, D. W. and Hilbert, G. E., The acylation of Corn Starch, Amylose and Amylopectin, J.Amer.Chem.Soc. 73 (1952) 346–349 or Gros, A. T. and Feuge, R. O., Properties of Fatty Acid Esters of Amylose, J.Amer.Oil Chemists's Soc 39 (1962) 19–24.

The degree of substitution of the starch ester is preferably about 1 to 2.95, in particular about 1.5 to 2.9.

Starch acetates can be prepared by reacting starch with acetic anhydride in the presence of a catalyst. The catalyst used comprises, for example, 50% sodium hydroxide. Other preparation processes known in the art for preparing acetates are suitable for preparing starch acetate. By varying the amount of acetic anhydride, the amount of the alkali used as a catalyst, and the reaction time, it is possible to prepare starch acetates having different amounts of degrees of substitution. Barley starch is the model starch used in the examples; the same method is suitable also for other starches (for other natural starches, hydrolyzed starches, oxidized starch, etherified starch etc.).

Preparation of the Thermoplastisized Starch Component

The desired end product, i.e. the thermoplastisized starch or starch component, is prepared via a coupling agent by reacting the polymer chains of the polyester with starch. The coupling agents, which react with the hydroxyl groups at the terminal ends of the chains and in starch, respectively. According to the present invention it is possible to prepare a biodegradable starch derivative with a relatively high molar mass from an OH-terminated prepolymer, diisocyanate and from a starch component which is totally or only partially soluble in the melt of the prepolymer by using relatively short polymerization times. The coupling reaction, which in the following also is called grafting, is preferably carried out as bulk polymerization in the melt state. The diisocyanate used preferably comprises an aliphatic or alicyclic diisocyanate. The granular structure of native starch is at least partly decomposed (>50%, preferably over 80%) in connection with the grafting reaction, which gives rise to gelling/plasticizing of the starch.

In the examples indicated below, the grafting of the hydroxy terminated polyester prepolymer was carried out as melt blending in a BRABENDER Plasti-Corder PL 2000 apparatus. The process was computer controlled and the progress of the coupling reactions could be monitored by controlling changes in the torque of the kneaders and in the temperatures of the melt mass.

The starch components used in these examples mainly comprise starch esters and native starch which was dried less than three hours at 105° C. before melt blending. The hydroxy terminated lactic acid oligomer was kept at a reduced pressure of 1,000 mbar (=in vacuum) at 30° C. over-night. The drying was carried out in order to minimize the probability of a chemical reaction between the isocyanate and water. 1,6-hexamethylene diisocyanate was chosen as diisocyanate.

In principle, it is possible to charge the melt blender with all components simultaneously. According to one preferred embodiment, in order to increase the chain of the polyester prepolymer and in order to minimize side reactions, the diisocyanate is first reacted with the hydroxyl-terminated oligomer in the melt blender, typically for 15 to 40 minutes. The starch component is then mixed with the thus formed isocyanate-terminated oligomer. In order to minimize decomposition reactions, if any, the molten mass was removed from the melt blender within a few minutes from the point of time when a momentum maximum was observed. The blending times are in the range of 1 minute to 48 hours, typically about 10 minutes to 5 hours, in particular about 15 minutes to 2 hours. In practice, it is possible to stop mixing at a stage when it is certain that the starch component has been dissolved into the hydroxy acid melt and that the momentum reading does not grow any more.

The amount of diisocyanate is calculated from the molar mass of the OH-terminated oligomer. The molar ratio between the isocyanate groups of the diisocyanate and the hydroxyl groups of the polyester is typically kept at 1.0 to 2.0. The preferred molar ratio depends on the starch component used, on the time of addition and on the set temperature. The grafting reaction are preferably carried out at a temperature of about 140 to about 200° C., preferably at about 160 to 180° C., until the obtained product is at least essentially free from free isocyanate groups.

The reaction can be carried out in the presence of a catalyst. Preferred catalysts are, by way of example, tin octoate, dibutyltin dilaurate, dibutyltin diacetate and tertiary amines, such as 1,4-diaza(2,2,2)bicyclo-oktane. The catalyst amount is 2%, at the most, of the total weight of the reaction mixture.

Polymer Properties

The polymer is melt-processible, the viscosity of the polymer melt being between 10 and 5,000 Pa s, preferably 50 and 2,000 Pa s, determined by capillary rheometry at a temperature of 140 to 200° C. at a shear rate of 200 1/s.

The concept that primary decomposition mechanism of polymers formed from, in particular, lactic acid, is hydrolysis, which requires aqueous conditions, is generally accepted. Hydrolysation is the first phase of biodegradation, which makes it easier for the microbes to decompose low molar mass hydrolysis products. In addition to the aliphatic ester bond, the urethane bond is generally considered a biodegradable structure.

The mechanical properties of the products prepared by coupling polymerization have been determined. Table 3 which is described in connection with the working examples, shows that the tensile strength and the modulus of elasticity are very good. The polymer samples, including the reference samples, were obtained by sawing pieces from compression moulded sheet.

Blending, Filling and Reinforcing of the Plastisized Starch

The new starch product can be melt-blended with other melt-processible polymers (e.g. thermoplastics), whereby, depending on the blending proportions, either the properties of the novel starch polymer or those of the other polymer are modified. As examples of polymers, which can be melt-blended with the novel starch product, poly(caprolactone), polylactide and poly(ester-urethane) can be mentioned, which will affect the mechanical properties, the biodegradability and the price of the polymer blend.

The new polymer composition can also be filled or reinforced with fillers or reinforcing agents, which makes it possible, for example, to increase the heat resistance of the plastisized starch, to improve the mechanical properties or to decrease the costs thereof. Suitable fillers are, for example, native starch, chalk or talc. Suitable reinforcing agents are, e.g., fibres of lactic acid based polymers (e.g., polylactide fibres), cellulosic pulp (e.g. pine pulp), cellulosic fibrous matter of cereal origin (e.g cellulose fibres of barley husk), cereal pentosanes (e.g. pentosans of barley husk), cotton fibres, fibres of Abaca hemp, sisal fibres, ramie fibres, linen fibres, jute fibres or biologically degradable glass fibres. Said mixture is blended with the biodegradable material in order to produce a discontinuous structure. The fibre material does not only substantially improve the impact strength of the compositions, it also provides discontinuity interfaces in the internal structure of the material, which interphases promote absorption of water and the biodegrading of the composition.

Applications of the Polymer Compositions

The novel polymer compositions have a broad application range. Thus, they can be used for the preparation of injection moulded pieces and thermoformed and blow moulded packages and bottles. The polymer can be used as a coating for bags, sacks and films made of paper or cardboard. They can be shaped into blow moulded or plane films from which packages, bags and sacks can be made. The polymers can also be used for the preparation of expanded plastic products, cellular plastic and foams, suitable for, e.g., preparing package fillings. Finally, they are suitable as coatings or matrices for controlled-released fertilizers and drugs. According to one particularly preferred embodiment, the novel plastisized starch is used as a component of melt glues.

The following examples will describe the invention in more detail:

EXAMPLE 1

Preparation of Starch Acetate

Starch acetates having different degrees of substitution and molar masses were prepared by using the reagent amounts described in the following table:

TABLE 1

Preparation of starch acetate, reaction conditions and product analysis

| Test no. | Starch quality | Amount of starch | Acetic anhydride | NaOH 50% | Reaction time | Dry matter | D.S. |
|---|---|---|---|---|---|---|---|
| 1 | Native barley starch.[a] | 40 kg | 175 kg | 4.4 kg | 10 h | 99.0% | 2.9 |
| 2 | Native barley starch.[a] | 34 kg | 150 kg | 3.8 kg | 5 h | 91.4% | 1.7 |
| 3 | Acid hydrol. barley starch.[b] | 20 kg | 80 kg | 3.0 kg | 5 h | 95.9% | 2.1 |
| 4 | Enzym. hydrol. barley starch[c] | 38 kg | 150 kg | 8.3 kg | 5 h | 96.6% | 2.8 |
| 5 | Enzym. hydrol. barley starch[c] | 100 g | 400 g | 10.5 g | 5 h | 98.8% | 2.4 |
| 6 | Enzym. hydrol. barley starch[d] | 100 g | 400 g | 5.3 g | 5 h | 99.3% | 2.9 |

D.S = Degree of Substitution (Method of determination: Wurzburg, O. B., Acetylation, in Methods in Carbohydrate Chemistry, Vol. IV, ed. R. L. Whistler, Academic Press, New York and London, 1964, p . 288)
a–d are barley starch qualities of different molar masses (Table 2)

The starch and the acetic anhydride were charged into a reactor and the mixing was turned on. The temperature of the mixture was raised to 60° C. and an 50% aqueous sodium hydroxide solution was gradually added. The reaction mixture was heated to about 40–60° C. during the addition. After the addition of NaOH. The temperature of the reaction mixture was raised to 125° C. for the time period indicated in the table. After the reaction, the mixture was cooled and precipitated by adding an about 5-fold amount of water under vigorous agitation. The precipitate was filtered and washed with water until the pH of the washing water was >5. The precipitate was spray-dried.

The relative differences between the molar masses of the starches used from acetate preparation have been characterized by Brabender-viscosity measurements. The determinations were carried out by using Brabender-viscoamylography. The instrument measures the momentum needed for balancing the viscosity increase of the starch slurry during a programmed heating cycle. The process is widely used in the starch industry for illustrating gelatinization of various starches and the properties of the formed pasta. A decrease of the molar mass will appear as a lowering of the viscosity.

The results are given in the following Table 2:

TABLE 2

Brabender-viscosities and temperatures illustrating gelatinization of the starches used for preparing starch acetates

| Starch quality | Temperature at the outset of gelat. °C. | Temperature at maximum viscosity °C. | Brabender-viscosity[1] | | | | |
|---|---|---|---|---|---|---|---|
| | | | B1 (BU) | C (BU) | D (BU) | E (BU) | F (BU) |
| Native barley starch[a] | 61.1 | 89.6 | 2760 | 2332 | 1715 | 10 | 2445 |
| Acid hydrol. barley starch[b] | 30.4 | 71.3 | 4 | 20 | 0 | 0 | 21 |
| Enzym. hydrol. barley starch.[c] | 30.8 | 30.8 | 231 | 62 | 31 | 211 | 64 |
| Enzym. hydrol. barley starch.[d] | 33.8 | 64.9 | 14 | 9 | 6 | 11 | 8 |

[1]Conditions of measuring the Brabender-viscosities:
Starch content of aqueous slurry 12%
Heating cycle: Initial temperature 30° C., increase of temperature to 95° C. at a rate of 1.5° C./min and a temperature hold at 95° C. for 15 min, decrease of temperature to 55° C. at a rate of 1.5° C./min and a temperature hold at 55° C. for 10 min.
Rotation speed: 75 1/min
Measurement area: 700 cmg
Abbreviations:
B1 = Momentum at maximum viscosity
C = Momentum when the temperature had reached 95° C.
D = Momentum at the outset of the cooling cycle
E = Momentum when the temperature had reached 55° C.
F = Momentum at the end of the measurement
BU = Brabender unit

EXAMPLE 2

Preparation of Hydroxyl-Terminated Poly(lactic acid) Prepolymer

As a reactor, a 2 liter "Rotavapor"-type rotatory evaporator was employed. 720 g L-lactic acid, 14.4 g 1,4-butane diol and 0.4 g stannous octoate were introduced into the reactor. Dry nitrogen was fed below the liquid surface of the reaction mixture and the reactor was evacuated to an absolute pressure of 190 mbar. The reaction vessel was partly immersed into an oil bath having a temperature of 160° C., and the reaction mixture was mixed by starting the rotation at a speed of 100 rpm. The temperature of the oil bath was increased steadily at a rate of 20° C./h up to a temperature of 200° C., and further on at a rate of 5° C./h to a temperature of 210° C. Then polymerization was continued for a further 4.5 hours in the oil bath at a temperature of 210° C. The pressure was lowered after one hour's polymerization to a pressure of 130 mbar and then with one hour-intervals to 100 mbar and 65 mbar. Once the pressure had been kept at 65 mbar for two hours, the pressure was three times more decreased by 15 mbar with one hour-intervals, until the pressure was 20 mbar at the end of the polymerization after 8.5 hours from the start. During the whole polymerization dry nitrogen was bubbled below the surface of the reaction mixture. The condensed water formed during polymerization was recovered as it was formed.

The molar mass of the polymer obtained was analysed on a GPC apparatus (Gel Permeation Chromatography) and the number average molar mass was determined as being 4,300 g/mol in comparison to polystyrene standards, and the polydispersity 1,7. $^{13}$C-NMR (solid-state nuclear magnetic resonance carried using the isotope $^{13}$C) analysis showed that the terminal groups of the polymer chains were almost completely hydroxyl groups and the polymer contained 5.7 wt-% L-lactide and 5,6 wt-% L-lactic acid. DSC-analysis (Differential Scanning Calorimetry) indicated that the glass transition temperature of the polymer was 39° C. and no crystalline melting peaks were noticed, which means that the polymer is entirely amorphous.

EXAMPLE 3

Preparation of Hydroxyl-Terminated Prepolymer from L-lactic Acid and ε-caprolactone The reactor used was a 2 liter rotary evaporator. 450 g dry L-lactic acid, 63.3 g ε-caprolactone (corresponding to 10 mol-%), 9.9 g 1,4-butanediol and 0.26 g stannous octoate were metered into the reactor. Dry nitrogen was fed below the surface of the reaction mixture and the reactor was evacuated to an absolute pressure of 230 mbar. The reaction vessel was partially immersed into an oil bath having a temperature of 160° C. The reaction mixture was mixed by starting the rotation at a speed of 100 rpm. The temperature of the oil bath was raised at a rate of 20° C./h up to a temperature of 200° C., and further on at a rate of 5° C./h to a temperature of 210° C. The pressure was reduced with one hour's intervals by the following steps: 230 (start)-180-130-100-80-60-50-40-30 mbar, and the last-mentioned pressure was maintained until the end of the polymerization. Nitrogen bubbling was maintained during the whole polymerization and the water formed during the reaction was recovered as it was formed. The total polymerization time was 16 hours.

The molar mass of the polymer obtained was analysed on a GPC apparatus. The number average molar mass was determined as being 7,080 g/mol in comparison to polystyrene standards, and the polydispersity was 1.6. DSC-analysis indicated that the glass transition temperature of the polymer was 17° C. and no crystalline melting peaks were noticed, which means that the polymer is entirely amorphous.

EXAMPLE 4

Preparation of Hydroxyl-Terminated Prepolymer from L-lactic Acid and ε-caprolactone The polymerization was carried out as described in example 3 with the exception that the amount of L-lactic acid was 450 g, the amount of ε-caprolactone was 30.0 g (corresponding to 5 mol-%), the amount of 1.4-butanediol was 9.5 g and the amount of stannous octoate was 0.24 g. The total polymerization time was 24 hours. The molar mass of the polymer obtained was analysed on a GPC apparatus. The number average molar mass was determined as being 8,010 g/mol in comparison to polystyrene standards, and the polydispersity was 1.5. DSC-analysis indicated that the glass transition temperature of the polymer was 28° C. and no crystalline melting peaks were noticed, which means that the polymer is entirely amorphous.

EXAMPLE 5
Preparation of Hydroxyl-Terminated Prepolymer from L-lactic Acid and ε-caprolactone The polymerization was carried out as described in example 3 with the exception that the amount of L-lactic acid was 450 g, the amount of ε-caprolactone was 100.6 g (corresponding to 15 mol-%), the amount of 1.4-butanediol was 10.6 g and the amount of stannous octoate was 0.28 g. The total polymerization time was 16 hours. The molar mass of the polymer obtained was analysed on a GPC apparatus. The number average molar mass was determined as being 8 410 g/mol in comparison to polystyrene standards, and the polydispersity was 1.5. DSC-analysis indicated that the glass transition temperature of the polymer was 10° C. and no crystalline melting peaks were noticed, which means that the polymer is entirely amorphous.

EXAMPLE 6

40 g of an OH-terminated oligomer prepared from L-lactic acid with a "true" number average molar mass of 2,300 g/mol was metered into a decanter. The decanter was further charged with 3.7 g of 1,6 hexamethylene-diisocyanate ($n_{oligo}:n_{NCO}$=1:1.25). The components were preblended.

A melt blender W 50 EH, having a blending chamber volume of 60 cm³, was calibrated at a set temperature of 180° C. at a mixing rate of 30 l/min (liters/minute). The preblend was metered into the mixing chamber while the kneaders were rotating. The feeding of the preblend was carried out as quickly as possibly so that the mixing times of the various blending batches would be comparable. The dosing opening was covered with a 5 kg weight and the measuring program was started. Soon after the feed, the measured temperature of the melt was 179° C. 27 g starch acetate (Table 1, test 4) was added to the molten mass after 40 minutes. In connection with the addition of the starch component the momentum readings momentaneously increased to 20 Nm (Newton.Meter), until melting has taken place. After this the momentum readings only had a decreased. On basis of what has been stated above, it can be presumed that no grafting, not at least to any substantial degree has taken place. The molten mass was removed from the melt blender after 60 minutes from the start of the measuring.

EXAMPLE 7

The melt blending was carried out as in Example 6 with the difference that the amount of 1,6-hexamethylene-diisocyanate used was 4.4 g ($n_{oligo}:n_{NCO}$=1:1.5). The maximum torsional momentum was found after 57 minutes, at a time when the temperature of the melt was 188° C. The total blending time was 60 minutes. The glass transition point determined by DSC was 54° C. The tensile strength properties of the product are indicated in Table 3.

EXAMPLE 8

The melt blending was carried out as in Example 6 with the difference that the amount of 1,6-hexamethylene-diisocyanate used was 5.8 g ($n_{oligo}:n_{NCO}$=1:1.5). The maximum torsional momentum was found after 55 minutes, at a time when the temperature of the melt was 195° C. The total blending time was 57 minutes. The glass transition point determined by DSC was 55° C. The tensile strength properties of the product are indicated in Table 3.

EXAMPLE 9

As Example 7 with the difference that the amount of the hydroxyl-terminated oligomer used was 20 g, the amount of starch acetate 40 g and the amount of 1,6-hexamethylene-diisocyanate 2.2 g ($n_{oligo}:n_{NCO}$=1:1.5). The maximum value for the torsional momentum was found after 50 minutes, at a time when the temperature of the melt was 193° C. The total blending time was 54 minutes. The glass transition point determined by DSC was 53° C. The tensile strength properties of the product are indicated in Table 3.

EXAMPLE 10

As Example 8 with the difference that the amount of the hydroxyl terminated oligomer used was 20 g, the amount of starch acetate 40 g and the amount of 1,6-hexamethylene-diisocyanate 2.9 g ($n_{oligo}:n_{NCO}$=1:2). The maximum value for the torsional momentum was found after 47 minutes, at a time when the temperature of the melt was 192° C. The total blending time was 49 minutes. The glass transition point determined by DSC was 49° C. The tensile strength properties of products prepared by compression moulding are indicated in Table 3.

TABLE 3

Preliminary tensile strengths of compression moulded samples of starch acetate (DS = 2.8) grafted with urethane bonds

| Sample | E/MPa | $\delta_{max}$/MPa |
| --- | --- | --- |
| 40 wt % starch acetate | | |
| Example 7 | 1,299 ± 122 | 24 ± 1.6 |
| Example 8 | 1,196 ± 143 | 22 ± 0.9 |
| 60 wt % starch acetate | | |
| Example 9 | 1,233 ± 169 | 12 ±0.6 |
| Example 10 | 1,433 ± 100 | 15 ± 2.1 |

The percentages indicated for the samples describe the relative amount of starch acetate in the feed. The abbreviations used were E=flexular modulus, and δmax=maximum stress.

When the concentration of the starch acetate in the feed has been calculated, the amount of diisocyanate has not been included. Instead the calculations are based solely on the amounts of the starch component and the prepolymer.

An examination of the results in Table 3 shows an encouraging level of 20–30 MPa of tensile strength at break for the samples prepared by compression moulding. The values of the coefficient of elasticity are good.

For comparison, the tensile strength tests were performed also for the pure, non-compatibilized mixtures, with OH-terminated lactic acid oligomers and the same starch derivative as above. The tests were performed for two mixtures: 40/60 and 60/40 expressed as the relations of weight percentages. Both oligomer/starch mixtures were so fragile, that the test specimens broke when they were fixed to the testing equipment.

Also the strength of the poly(ester urethane)(PEU)/starch mixture were tested. For a mixture of 60 weight % poly(ester urethane) (average molar mass ca 50,000 g/mol) and 40 weight % starch acetate corresponding to that in the experiment in Table 3, it was concluded that the coefficient of elasticity was slightly lower and the maximum stress almost 50% lower than for the products of Examples 7 and 8. The poly(ester urethane) was prepared according to the publication mentioned on page 10.

EXAMPLE 11

The melt blending was carried out as in Example 7 ($n_{oligo}:n_{HMDI}$=1:1.5), except that the starch acetate was added after five minutes. The maximum torsional momentum was observed after 30 minutes, at a time when the temperature of the melt was 185° C. The total blending time was 32 minutes. The glass transition point determined by DSC was 53° C.

EXAMPLE 12

As in Example 11, except that the starch acetate was added after 15 minutes. The maximum torsional momentum was observed after 37 minutes, at a time when the temperature of the melt was 186° C. The total blending time was 40 minutes. The glass transition point determined by DSC was 50° C.

EXAMPLE 13

As in Example 12, except that the starch acetate was added after 30 minutes. The maximum torsional momentum was observed after 45 minutes, at a time when the temperature of the melt was 187° C. The total blending time was 48 minutes. The glass transition point determined by DSC was 48° C.

Examples 7 and 11–13 show that the components of the polymer composition can be made to react with each other regardless of the time of the addition of the modified starch. This applies especially for starch acetate with a high degree of substitution.

EXAMPLE 14

As in Example 7, with the exception that a starch acetate with a higher molar mass was used (Table 1, test 1). Now the maximum torsional momentum was observed already after 47 minutes, at a time when the temperature of the melt was 193° C. The total blending time was 47 minutes. As in Example 7, the resulting product was homogeneous, its glass transition point determined by DSC was 53° C.

EXAMPLE 15

As in Example 14, except that the starch acetate was added already after 30 minutes. The maximum momentum was observed after 40 minutes, at a time when the temperature of the melt was 192° C. The total blending time was 42 minutes. The glass transition point determined by DSC was 54° C. The tensile strength coefficients of the samples prepared by compression moulding were: coefficient of elasticity 1409±157 MPA; maximum stress 24±3,4 MPA.

EXAMPLE 16

As in Example 14, except that the molar amount of 1.6-hexamethylene-diisocyanate was 1.75 times the amount of the OH-terminated oligomer. In addition, the starch acetate used was enzymatically further hydrolyzed (Table 1, test 6). The maximum momentum was observed after 46 minutes, at a time when the temperature of the melt was 185° C. The glass transition point of the homogeneous resulting product, as determined by DSC, was 49° C. The tensile strength coefficients of the samples prepared by compression moulding were: coefficient of elasticity 1299±122 MPa; maximum stress 15±0,1 MPa.

EXAMPLE 17

As in Example 8, except that the degree of substitution of the starch acetate was lower (Table 1, test 5). The maximum momentum observed after 44 minutes, at a time when the temperature of the melt was 189° C. The total blending time was 45 minutes. The glass transition point determined by DSC was 49° C.

EXAMPLE 18

As in Example 17, except that the starch acetate was added to the melt already after 20 minutes. The maximum momentum was observed after 24 minutes, at a time when the temperature of the melt was 185° C. The glass transition point determined by DSC was ca 45° C.

EXAMPLE 19

As in Example 7, except an acid hydrolyzed starch acetate was used, having a lower Brabender-end viscosity and a lower degree of substitution (Table 1, test 3). The maximum torsional momentum was observed after 48 minutes, at a time when the temperature of the melt was 192° C. The total blending time was 50 minutes. The glass transition point determined by DSC was 54° C.

EXAMPLE 20

In a decanter was weighed 20 g OH-terminated oligomer with a number average molar mass of 2,300 g/mol, prepared from L-lactic acid. To the decanter was added 2.2 g 1.6-hexamethylene-di-isocyanate ($n_{oligo}:n_{NCO}$=1:1.5). The components were premixed and dosed in a blending chamber, having a temperature of 190° C. and the rotating speed of the kneaders was 30 l/min. The dosage opening was covered with a 5 kg weight and the measurement program was started. Starch acetate corresponding to test 2 in Table 1 was added 10 g to the melt mass after 20 minutes. Blending was terminated after 70 minutes. The glass transition point as determined by DSC was 50° C.

EXAMPLE 21

In a decanter was weighed 30 g OH-terminated oligomer with a number average molar mass of 1,500 g/mol, prepared from D,L-lactic acid. To the decanter was added 5.0 g 1.6-hexamethylene-di-isocyanate ($n_{oligo}:n_{NCO}$=1:1.5). The components were premixed and dosed in a blending chamber, having a temperature of 160° C. and the rotating speed of the kneaders was 30 l/min. The dosage opening was covered with a 5 kg weight and the measurement program was started. Starch palmitate D.S.=2.0 was added 20 g to the melt mass after 25 minutes. The maximum momentum was observed after 58 minutes, at a time when the temperature of the melt was 173° C. Total blending time was 61 minutes. The glass transition point as determined by DSC was 47° C.

EXAMPLE 22

In a decanter was weighed 30 g OH-terminated oligomer with a number average molar mass of 2,300 g/mol, prepared from L-lactic acid. To the decanter was added 3.3 g 1.6-hexamethylene-di-isocyanate ($n_{oligo}:n_{NCO}$=1:1.5). The components were premixed and dosed in a blending chamber, having a temperature of 160° C. and the rotating speed of the kneaders was 30 l/min. The dosage opening was covered with a 5 kg weight and the measurement program was started. Starch stearate-palmitate (a mixed ester of starch palmitate and starch stearate, with palmitate 20.3 weight % and stearate 17.6 weight %, D.S. ca 2.3) was added 20 g to the melt mass after 30 minutes.

The maximum momentum was observed after 65 minutes, at a time when the temperature of the melt was 178° C. Total blending time was 66 minutes. The glass transition point as determined by DSC was 54° C.

EXAMPLE 23

In a decanter was weighed 30 g OH-terminated oligomer with a number average molar mass of 2,300 g/mol, prepared from L-lactic acid. To the decanter was added 3.8 g 1.6-hexamethylene-di-isocyanate ($n_{oligo}$:$n_{NCO}$=1:1.7). The components were premixed and dosed in a blending chamber, having a temperature of 180° C. and the rotating speed of the kneaders was 30 l/min. The dosage opening was covered with a 5 kg weight and the measurement program was started. Starch acetate-propionate, with a degree of substitution 0.98 with regard to acetate and 0.55 with regard to propionate, was added 20 g to the melt mass after 30 minutes. The maximum torsional momentum was observed after 36 minutes, at a time when the temperature of the melt was 193° C. Total blending time was 41 minutes. The glass transition point as determined by DSC was 53° C.

EXAMPLE 24

In a decanter was weighed 30 g OH-terminated oligomer with a number average molar mass of 2,300 g/mol, prepared from L-lactic acid. To the decanter was added 3.8 g 1.6-hexamethylene-di-isocyanate ($n_{oligo}$:$n_{NCO}$=1:1.5). The components were premixed and dosed in a blending chamber, having a temperature of 180° C. and the rotating speed of the kneaders was 30 l/min. The dosage opening was covered with a 5 kg weight and the measurement program was started. After 30 minutes a mixture was added to the melt mass, consisting of 15 g starch acetate corresponding to the Examples 6–13 and 5 g starch acetate-palmitate corresponding to the Example 22. The maximum torsional momentum was observed after 42 minutes, at a time when the temperature of the melt was 188° C. Total blending time was 43 minutes. The glass transition point as determined by DSC was 50° C.

EXAMPLE 25

In a decanter was weighed 20 g prepolymer, corresponding to the Example 5. To the decanter was added 2.1 g 1.6-hexamethylene-di-isocyanate. The components were premixed. The melt blender W 50 EH, having a blending chamber volume of 60 cm$^3$, was calibrated for the temperature 180° C. and the mixing speed 30 l/min. The preblend was dosed into the blending chamber while the kneaders were rotating. The dosage opening was covered with a 5 kg weight and the measurement program was started. Native barley starch (Table 2) was added to the melt mass 30 g after 40 minutes. When the starch component was added the torque values rose momentarily to 38 Nm, until the melting had occurred. A new maximum torque was observed at 57 minutes, when the temperature of the melt was 188° C. Total blending time was 60 minutes. The glass transition point as determined by DSC was 15° C. The preliminary tensile strength coefficients of the bars (4 mm*6 mm*50 mm) were determined at 20° C.: coefficient of elasticity≦150 MPa; maximum stress 6±1 MPa and ultimate elongation ca 60%.

EXAMPLE 26

The melt blending was performed as in Example 25, except that a prepolymer corresponding to Example 4 was used. In addition 2.2 g of 1.6 hexamethylene-di-isocyanate was used. When the starch component was added the torsional values rose momentarily to 37 Nm, until the melting had occurred. A new maximum torque was observed at 51 minutes, when the temperature of the melt was 197° C. Total blending time was 52 minutes. The glass transition point as determined by DSC was 30° C. The preliminary tensile strength coefficients of the bars (4 mm*6 mm*50 mm) were determined at 20° C.: coefficient of elasticity 1000 MPa; maximum stress 23±7 MPa and ultimate elongation ca 2%.

EXAMPLE 27

The melt blending was performed as in Example 26, except that 20 g of native barley was used. When the starch component was added the torque values rose momentarily to 20 Nm, until the melting had occurred. A new maximum torque was observed at 65 minutes, when the temperature of the melt was 189° C. Total blending time was 66 minutes. The glass transition point as determined by DSC was 33° C. The preliminary tensile strength coefficients of the bars (4 mm*6 mm*50 mm) were determined at +20° C.: coefficient of elasticity 1560 MPa; maximum stress 22±1 MPa and ultimate elongation ca 3%.

EXAMPLE 28

The melt blending was performed as in Example 27, except that a prepolymer corresponding to Example 3 was used. In addition 1.6 g of 1.6 hexamethylene-di-isocyanate was used. When the starch component was added the torsional values rose momentarily to 22 Nm, until the melting had occurred. A new maximum momentum was observed at 56 minutes, when the temperature of the melt was 191° C. Total blending time was 60 minutes. The glass transition point as determined by DSC was 27° C. The preliminary tensile strength coefficients of the bars (4 mm*6 mm*50 mm) were determined at +20° C.: coefficient of elasticity 750 MPa; maximum stress 14±1 MPa and ultimate elongation ca 45%.

Figure 3:
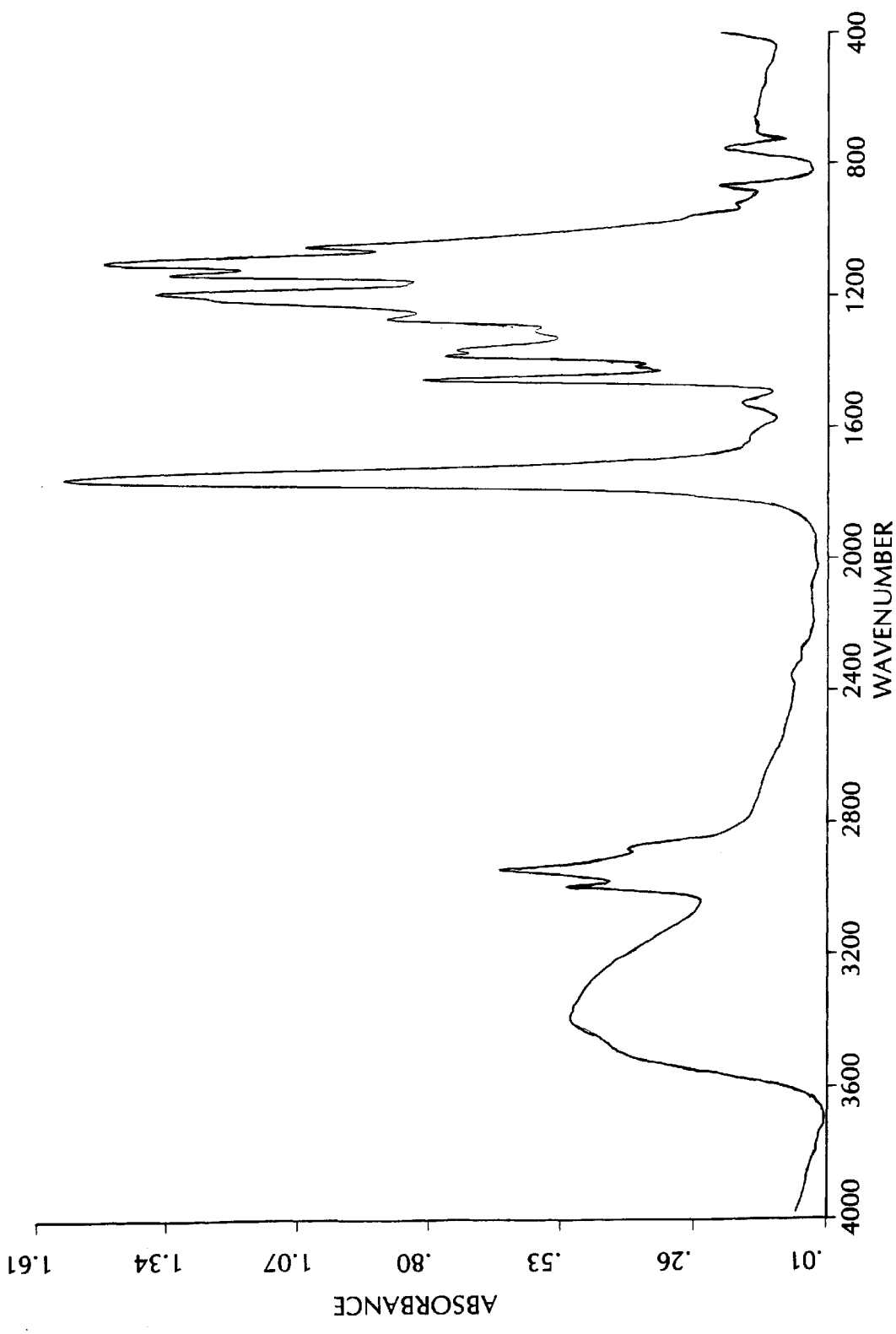
FIG. 3 shows the IR-spectrum relating to example 28.

A non-grafted prepolymer was extracted in chloroform (12 h). The IR-spectrum of the component that did not dissolve in the chloroform extraction is given in FIG. 3.

EXAMPLE 29

In a melt blender, with a temperature of 180° C., was weighed 50 g of a prepolymer corresponding to Example 3. After the prepolymer had melted, the measurement program was started with a mixing speed of 50 l/min and 2.8 g of 1.6-hexamethylene-di-isocyanate was pipeted to the blending chamber. The blending torque values rose for an hour. Blending was continued for an other hour, to assure that all isocyanate groups had reacted.

Figure 4:
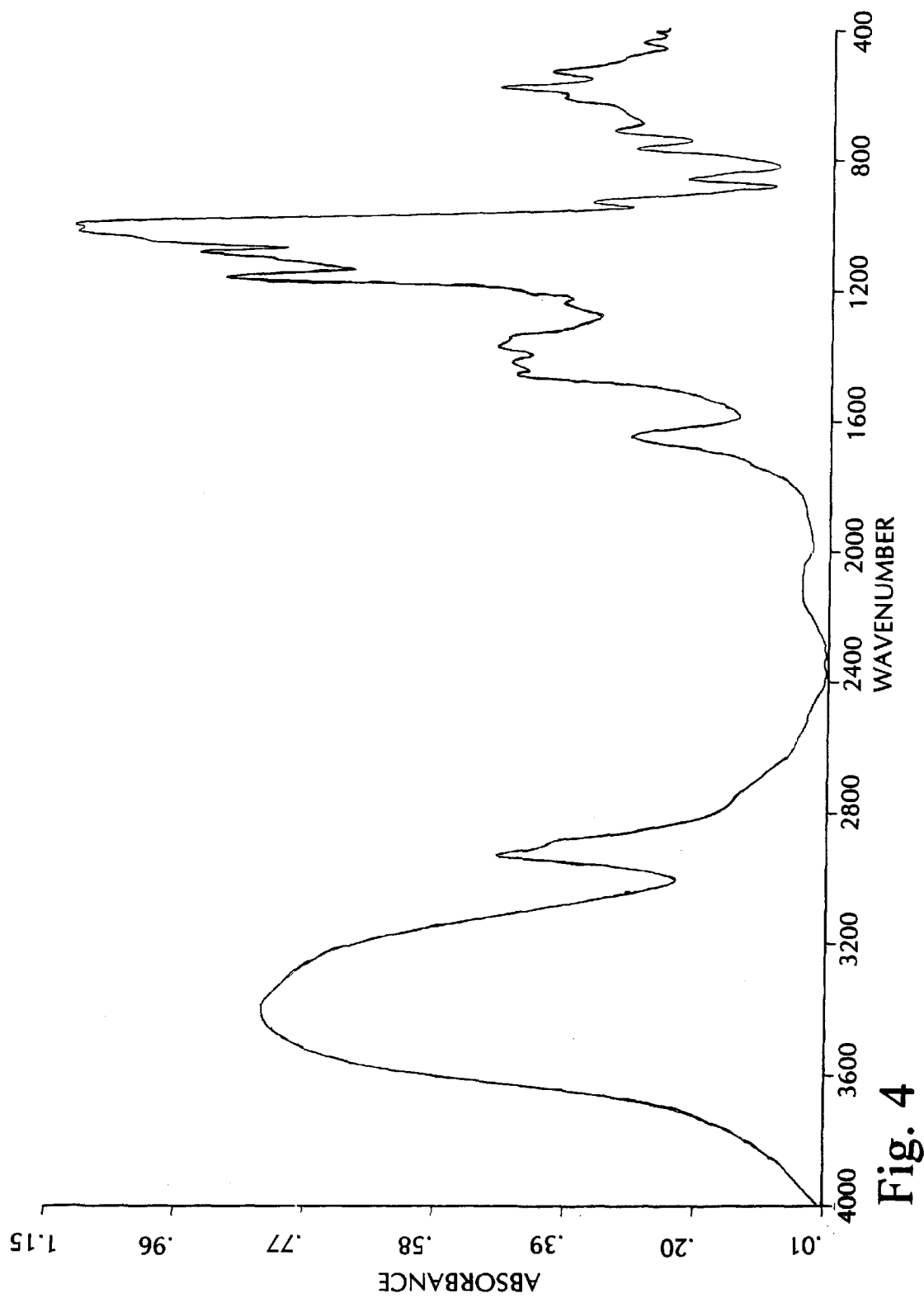
FIG. 4 shows the IR-spectrum relating to example 29.

After this, a mixture of the above prepared polymer and native barley starch was prepared in the melt blender (180° C., 75 l/min), so that the share of starch (48 weight %) was the same as in Example 28. The polyester component was extracted from the blend with chloroform. The amount of the extracted matter was 52%. As above, an IR-spectrum was made for the fraction not dissolved in chloroform. The spectrum, FIG. 4, corresponds to the IR-spectrum of barley starch.

EXAMPLE 30

In a decanter was weighed 20 g prepolymer, corresponding to the Example 3. To the decanter was added 1.6 g 1.6-hexamethylene-di-isocyanate. The components were premixed. The melt blender W 50 EH, having a blending chamber volume of 60 cm$^3$, was calibrated for the temperature 180° C. and the mixing speed 50 l/min. The preblend was dosed into the blending chamber while the kneaders were rotating. The dosage opening was covered with a 5 kg weight and the measurement program was started. Starch acetate (D.S.=2.26) was added to the melt mass 20 g after 20 minutes. The starch acetate was prepared according to the test 1 in Table 1, except that the reaction time was shorter (2 h). A maximum torsion momentum was observed at 27 minutes, after which the torsional momentum very slowly decreased. Total blending time was 60 minutes. The preliminary tensile strength coefficients of the bars (4 mm*6 mm*50 mm) were determined at +20° C.: coefficient of elasticity 500 MPa; maximum stress 18±3 MPa and ultimate elongation ca 4%.

EXAMPLE 31

In a decanter was weighed 24 g prepolymer, corresponding to the Example 2. To the decanter was added 2.6 g 1.6-hexamethylene-di-isocyanate. The components were premixed. The melt blender W 50 EH, having a blending chamber volume of 60 cm$^3$, was calibrated for the temperature 180° C. and the mixing speed 50 l/min. The preblend was dosed into the blending chamber while the kneaders were rotating. The dosage opening was covered with a 5 kg weight and the measurement program was started. Native barley starch was added to the melt mass 16 g after 20 minutes. The melt blending was discontinued immediately after the maximum torque was observed.

The preliminary tensile strength coefficients of rods (4 mm*6 mm*50 mm) were tested for coefficient of elasticity 1270 MPa; maximum stress 23±2 MPa and ultimate elongation ca 2%.

EXAMPLE 32

In a decanter was weighed 30 g OH-terminated oligomer with a number average molar mass of 2,300 g/mol. prepared from L-lactic acid. To the decanter was added 3.3 g 1.6-hexamethylene-di-isocyanate ($n_{oligo}:n_{NCO}$=1:1.5). The components were premixed and dosed in a blending chamber, having a temperature of 160° C. and the rotating speed of the kneaders was 30 l/min. The dosage opening was covered with a 5 kg weight and the measurement program was started. Hydroxy propyl starch, known by the brand name COHPOL DL 20 (manufactured by Primalco Oy, Polymer division), was added 20 g to the melt mass after 30 minutes. Maximum torsional momentum was observed at 35 minutes, when the temperature of the melt was 163° C. The glass transition point as determined by DSC was 49° C.

EXAMPLE 33

In a decanter was weighed 28 g OH-terminated oligomer with a number average molar mass of 2,300 g/mol, prepared from L-lactic acid. To the decanter was added 4.1 g 1.6-hexamethylene-di-isocyanate ($n_{oligo}:n_{NCO}$32 1:2). The components were premixed and dosed in a blending chamber, having a temperature of 190° C. and the rotating speed of the kneaders was 30 l/min. The dosage opening was covered with a 5 kg weight and the measurement program was started. Gelatinized native barley starch (see below) was added 12 g to the melt mass after 15 minutes. Maximum momentum was observed at 37 minutes, when the temperature of the melt was 194° C. The resulting product was light brown, homogeneous and extremely hard. The glass transition point as determined by DSC was 51° C.

The starch was gelatinized by driving 15% native barley starch aqueous slurry from the feeding container into a pipe with superheated steam. Thereby the starch was gelatinized at ca 100° C. The gelatinized starch was homogenized by driving the sludge immediately through a homogenizer of the wet grinding type. The homogenization was effectivized by cycling the slurry several times through the cutters. After the homogenization the gelatinized starch was stored and dried with a spray dryer. After drying, a sample was taken from the gelatinized native barley starch, from which an aqueous slurry was made for measuring the Brabender-viscosities. The Brabender-viscosities of the aqueous slurry with a 12% starch content corresponded to the following figures in measuring circumstances according to Table 2: B1=512 BU, C=345 BU, D=274 BU, E=512 BU and F=352 BU.

EXAMPLE 34

Hygroscopicity Tests

The water adsorption was tested at Valtion teknillisen tutkimuskeskus Bio- ja Elin-tarviketekniikan tutkimusyksikkö. The samples were equilibriated in chambers whose relative humidity had been regulated by saturated saline solutions. The salts comprised LiCl, $Mg(NO_3)_2$, NaCl, $(NH_4)_2SO_2$, $KNO_3$ and $K_2SO_4$. The relative humidities were 12, 33, 56, 77, 91 and 97%, respectively. The chamber were kept at a temperature of 20° C. and the amount of absorbed waster was determined after 7 days gravimetrically.

The reference samples used comprised native barley starch and the starch acetate of Examples 6 to 13 which had a degree of substitution of 2.8. The tested grafts were less hygroscopic than the references. Thus, at the greatest relative hymidity the mass change of native barley starch was about 15% and of the starch actate 5%. The composition according to Example 8 absorbed at corresponding conditions slightly more than 2% waster and the composition of Example 10, for the preparation of which much more of the above-mentioned starch acetate had been used, aborbed 1.5%.

EXAMPLE 35

Showing of the Partial Decomposition of the Granular Structure of Starch by DSC

Figure 1A:
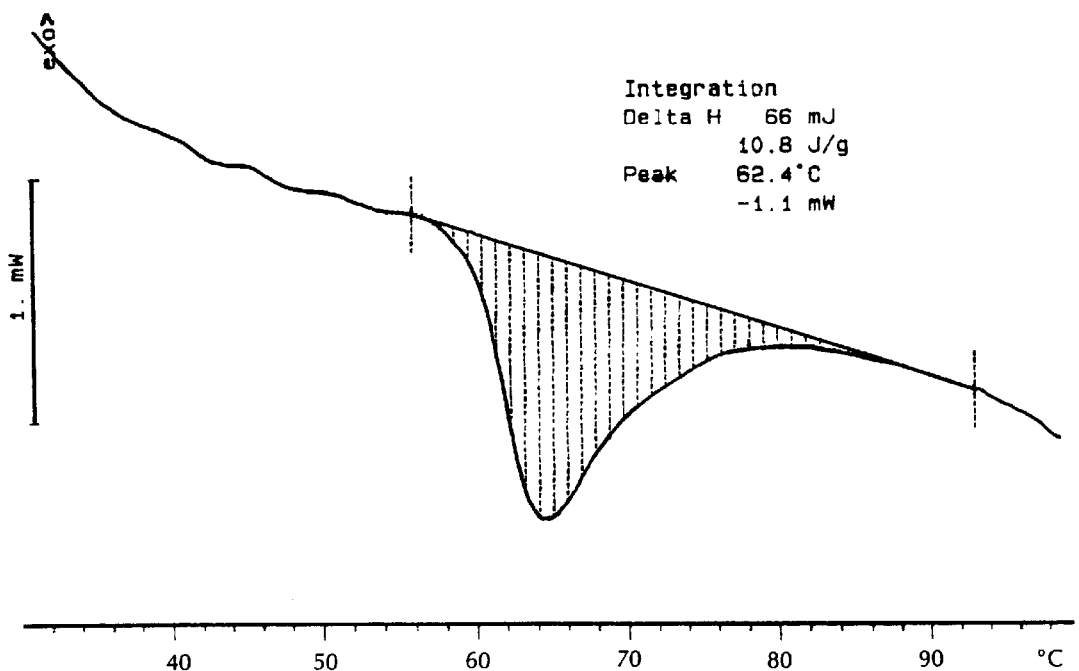
Figure 1B:
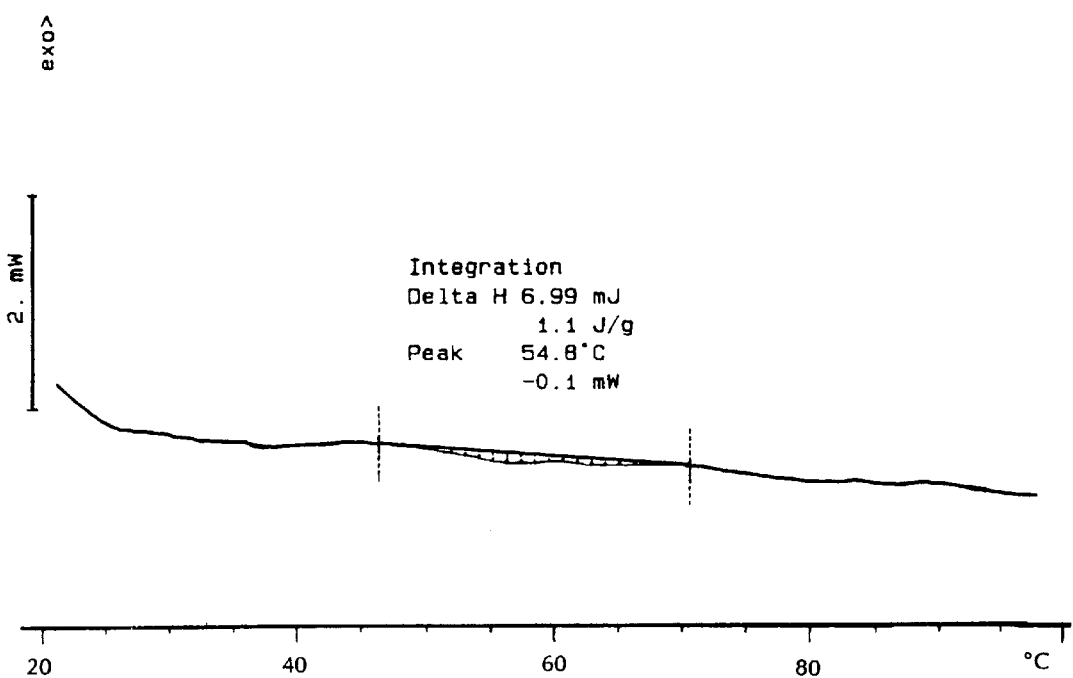
Figure 2:
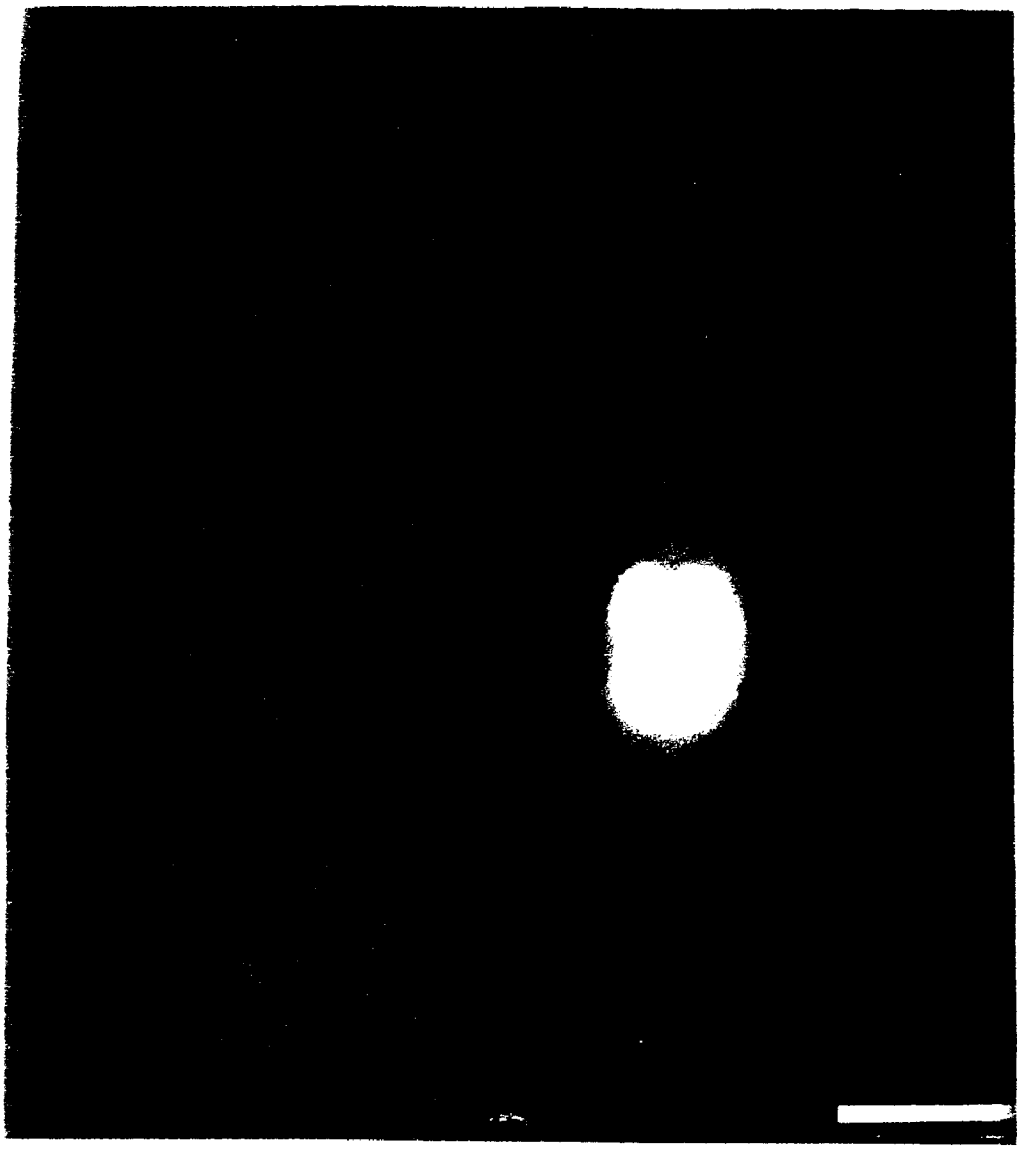
FIG. 2 shows the number of intact native starch granules under polarization microscope relating to example 28.

The sample of Example 28 was formed into an aqueous suspension in a DSC crucible. The water content of said suspension was about 70%. The suspension was heated from 10° C. to 100° C. at a rate of 10° C./min. For comparative purposes FIG. 1 also contains the typical DSC thermogram for native barley starch subjected to a similar analysis. From a comparison of the thermograms it appears that the granular structure of the native barley starch of Example 28 has undergone an almost 90% decomposition.

EXAMPLE 36

Biodegradation Test

The samples prepared according to Examples 7, 10, 14, 17 and 33 were subjected to a preliminary testing for biodegradability at Valtion teknillinen tutkimuskeskus Bio- ja Elintarviketekniikan tutkimusyksikkö (VTT Biotechnology and Food Research) by means of a so-called head-space test. The references used comprised the starch acetates according to tests 2 and 4 of table 1. 15 mg of the samples were metered into 120 ml head-space bottles. 50 ml of a culture medium (Modified Sturm Test (OECD 301 B); ASTM D 5209) and a microbial inoculum prepared from a compost in thermophilic stage were added. The bottles were incubated on a water bath at a temperature of 55° C. for 66 days and the carbon dioxide formed during biodegradation was measured directly from the gas space by an analysator based infra red technique. The biodegradation in precentages was calculated from the ratio of carbon dioxide to the theoretical concentration.

Of the reference samples the less substituted starch acetate was subjected to the most pregnant biodegradation; the carbon dioxide product of that sample was about 20% 14 days after incubation. After the same time the starch acetate with the higher degree of substitution was not, in essence, biodegraded at all. No significant change in the carbon dioxide product of the references could be found even 66 days after incubation. Of the actual sample, the product according to Example 14 was most rapidly biodegraded and already within 14 days of incubation its gas production was almost 40% of the theoretical amount. The carbon dioxide production of said sample increase further so that it amounted to 70% of the theoretic value after 66 days. After a slightly slower start the product prepared according to Example 33 also reached the same production level. The other sample started to biodegrade substantially only after 28 days of the incubation. During the testing period the products prepared according to Examples 7 and 17 has reached a 40 to 50% biodegradation. The slowest biodegradation could be found for the product according to Example 10. Said product had been prepared from 60% of a starch acetate having a high degree of substitution. Its gas product was at the end of the testing period about 30% of the theoretical value, which is considerably much more than reached with the reference samples.

EXAMPLE 37

Biodegradability

The biodegradability of a sample prepared according to Example 26 was preliminary examined in Valtion teknillinen tutkimuskeskus, Bio- ja Elintarviketeknikka (VTT Biotechnology and Food Research), by using a so called head-space test. 15 mg of the sample was weighted into 120 ml head-space bottles, then 50 ml of a nutrient medium (Modified Sturm Test (OECD 301 B); ASTM D 5209) and microbial inoculum from a compost in thermophilic stage were added. The bottles were incubated on a water bath at a temperature of 55° C. and the carbon dioxide formed during biodegration was determined directly from the gas space by using an analysator based on infrared technique. The percentage of biodegradation was calculated as a ratio of carbon dioxide from the theoretical concentration. The gas production of the positive control of biodegradation was about 60% of the theoretical value after 30 days of incubation and the corresponding value of the actual sample was 50% during the same period of time.

We claim:

1. A process for plastisizing starch, comprising
bringing the starch into a such a modified form that it contains at least some free hydroxyl groups and it is soluble in a hydroxyacid polymer melt,
reacting the thus modified starch with a thermoplastic component consisting of an isocyanate-terminated hydroxyacid polymer at 140–200° C., and
continuing the reaction until an at least essentially homogeneous mixture is obtained and the thermoplastic component is at least partially bound to the starch component by means of urethane bonds.

2. The process according to claim 1, wherein the starch component is gelatinizable/plasticizable into the hydroxyacid polymer melt.

3. The process according to claim 1, wherein the starch component is selected from the group consisting of natural starch having an amylose content of 0 to 100% and an amylopectine content of 100 to 0%, starch prepared therefrom by gelatinization, oxidized starch prepared by oxidation, esterified starch having a degree of substitution of less than 3, etherified starch having a degree of substitution of less than 3, cross-linked starch, hydroxy alkylated starch and cationic starch.

4. The process according to claim 1, wherein a mixture is formed, containing about 99 to 10% of the starch component and at least 1% of a polyester consisting of structural groups of a hydroxy acid.

5. A melt-processible polymer composition, which contains a starch component and a thermoplastic polymer component, wherein
the thermoplastic polymer component comprises a polyester containing hydroxy acid units, and
the polyester and the starch component are chemically bound together at least partially by means of urethane bonds, forming an at least essentially homogeneous mixture.

6. The polymer composition according to claim 5, wherein it contains some amide bonds between the polyester and the starch component.

7. The polymer composition according to claim 5, wherein it contains at least about 1% polymer and is capable of forming a homogeneous and/or compatibilized melt.

8. The polymer composition according to claim 5, wherein it contains about 98 to 10% of the starch component and 2 to 90% of the polyester.

9. The polymer composition according to claim 5, wherein the starch component is derived from modified starch which is soluble including is gelatinized/plasticized in the melt of the polyester and which contains at least some free hydroxyl groups.

10. The polymer composition according to claim 5, wherein the starch component is selected from the group consisting of natural starch having an amylose content of 0 to 100% and an amylopectine content of 100 to 0%, starch prepared therefrom by gelatinization, oxidized starch prepared by oxidation, esterified starch having a degree of substitution of less than 3, etherified starch having a degree of substitution of less than 3, cross-linked starch, hydroxy alkylated starch and cationic starch.

11. The polymer composition according to claim 10, wherein the starch component is derived from an ester of starch and one or more aliphatic $C_{2-24}$ carboxylic acids.

12. The polymer composition according to claim 11, wherein the carboxylic acid component of the ester is derived from acetic acid, propionic acid or butyric acid or a mixture thereof.

13. The polymer composition according to claim 11, wherein the carboxylic acid component of the ester is derived from a naturally occurring saturated or unsaturated fatty acid.

14. The polymer composition according to claim 11, wherein the carboxylic acid component is derived from palmitinic acid, stearic acid or a mixture thereof.

15. The polymer composition according to claim 12, wherein the starch component contains both long ($C_9$–$C_{24}$)- and short ($C_2$–$C_8$)-carboxylic acid components.

16. The polymer composition according to claim 15, wherein the starch component is a mixed ester of starch and acetic acid and stearic acid.

17. The polymer composition according to claim 11, wherein the degree of substitution of the esterified starch is about 1.5 to 2.95.

18. The polymer composition according to claim 5, wherein the polyester contains 80 to 99.9% repeating units derived from aliphatic and optionally aromatic hydroxy acids and 20 to 0.1% units derived from dioles.

19. The polymer composition according to claim 18, wherein the hydroxy acid-derived units are derived from monomers selected from the group consisting of L-lactic acid monomers, D-lactic acid monomers or mixtures thereof, glycolic acid monomers, ●-hydroxy-isobutyric acid monomers or mixtures thereof and mixtures of these and of lactic acid monomers, L-mandelic acid monomers, D-mandelic acid monomers and mixtures or p-hydroxy benzoic acid monomers, wherein the concentration of free hydroxy acid monomers and lactides is 3% or less of the weight of the polymer.

20. The polymer composition according to claim 18, wherein the polyester contains 1 to 60 wt-% of a cyclic aliphatic lactone, as a comonomer which increases its rubbery stiffness.

21. The polymer composition according to claim 5, wherein the diol units are aliphatic.

22. The polymer composition according to claim 5, wherein it is biologically degradable.

23. The polymer composition according to claim 5, wherein the viscosity of the polymer melt is in the range of 10 to 5,000 Pa s measured by capillary rheometry at a temperature of 140 to 200° C. at a shear rate of 200 l/s.

24. A method for preparing a melt-processible polymer composition containing a starch component and a thermoplastic polymer component, comprising forming from hydroxy acid monomers and a diol a hydroxy terminated polyester with a number average molecular weight of 500 to 15,000 g/mol, and reacting the polyester in optional order with diisocyanate and a starch component which is soluble, including gelatinizable/plasticizable in the hydroxy acid component.

25. The process according to claim 24, wherein the hydroxy terminated polyester is first reacted with a diisocyanate in order to convert the hydroxyl terminal groups into isocyanate groups and the isocyanate-terminated polyester is reacted with the starch component.

26. The process according to claim 24, wherein the hydroxy-terminated polyester is copolymerized simultaneously with diisocyante and the starch component.

27. The process according to claim 24, wherein the molar ratio between the diisocyanate and hydroxyl groups of the polyester is maintained at 1.0 to 2.0.

28. The process according to claim 23, wherein the copolymerization reactions are carried out in the melt phase keeping the temperature at a temperature of 140 to 200° C.

29. The process according to claim 23, wherein the copolymerization is continued until the obtained polymer composition is at least essentially free from free isocyanate groups.

30. The process according to claim 24, wherein the starch component is first brought into such a form that it contains at least some free hydroxyl groups and is soluble, including gelatinizable/plasticizable, in the melt of a polyester, a mixture is formed from the starch component and the polyester, the thus obtained mixture is heated under agitation, and the agitation is continued until the viscosity of the mixture is 10 to 5000 Pa s, when determined by capillary rheometry at 140–200° C. and a shear rate of 200 l/s.

31. A polymer blend, comprising the polymer composition of claim 5 blended with a thermoplastic.

32. The polymer composition of claim 5 mixed with at least one material selected from the group consisting of plasticizers, fillers and reinforcing agents.

33. The polymer composition or mixture according to claim 32, wherein the filler used comprises starch or modified starch.

34. The process according to claim 4, wherein the mixture comprises 2 to 90% of said polyester.

35. The composition of claim 8, wherein said polyester is present at 5 to 60%.

36. The composition of claim 23, wherein said viscosity is 50 to 2,000 Pa s.

37. The method of claim 27, wherein said molar ratio is 1.05 to 2.0.

38. The method of claim 37, wherein said molar ratio is 1.3 to 2.0.

39. The composition of claim 21 wherein said aliphatic diol units are ethylene glycol or 1,4-butane diol.

40. The composition of claim 20, wherein said cyclic aliphatic lactone is ●-caprolactone monomer.

41. A method of making an adhesive comprising adding a polymer composition according to claim 5 to a hotmelt glue composition.

42. A method of preparing a film comprising forming said film from a composition containing a polymer composition according to claim 5.

43. A method of producing a moulded article comprising injecting or blowing a composition according to claim 5 into a mold for a package, sac, bag or bottle.

44. A method of preparing a bag or cardboard comprising coating said bag or cardboard with a polymer composition according to claim 5.

45. A method of producing controllably released fertilizers or medicines comprising adding a polymer composition according to claim 5, to a fertilizer or medicine as a coating or matrix.

* * * * *